United States Patent Office 3,299,003
Patented Jan. 17, 1967

3,299,003
PROCESS FOR THE CONTINUOUS POLYMERIZATION OF LOWER CYCLIC FORMALDEHYDE POLYMERS
Erich Bäder, Hanau am Main, and Wolfgang Sibenhorn, Steinheim am Main, Germany, assignors to Deutsche Gold- und Silber-Scheideanstalt vormals Roessler, Frankfurt am Main, Germany
No Drawing. Filed Oct. 14, 1964, Ser. No. 403,917
Claims priority, application Germany, Oct. 18, 1963, D 42,748
6 Claims. (Cl. 260—67)

The present invention relates to an improved process for the continuous polymerization of lower cyclic formaldehyde polymers and especially for the polymerization of trioxane.

It is known that trioxane can be polymerized in the presence of cationically active substances. Such polymerization can be carried out by the mass or bulk polymerization methods but only in relatively small batches as it is most difficult to remove the considerable heat of polymerization with sufficient rapidity from the extremely poorly heat conductive polymerization mixture. When the polymerization is carried out in larger batches or in layers of considerable thickness, the heat of polymerization set free within the mass effects a very vigorous polymerization which again causes a still greater overheating. This, towards the end of the polymerization when most of the monomer has been used up, leads to considerable decomposition of the polymer originally formed under the influence of the catalyst still contained in the mixture. In addition, the removal of large blocks of the solid polymer from the apparatus and their comminution is so costly that it is not economically feasible.

As a consequence the polymerization has been carried out in inert solvents or suspending liquids which partially or completely dissolve the starting materials. In such polymerizations the polymer is produced in an insoluble finely divided form and can easily be recovered. However, these types of polymerization require considerably higher initiator concentrations if the polymerization is to be effected in acceptable periods of time. This causes a reduction in the average molecular weight of the polymer produced. In addition, the usual organic liquids employed as solvents or suspending agents themselves exhibit chain transfer activity which further decreases the average molecular weight of the polymers obtained. Nevertheless, a sufficiently high molecular weight is required to achieve satisfactory mechanical properties in the polymer. In order to hinder a still further reduction in the molecular weight of the product obtained, extremely high purity requirements must be met in the organic liquids used as solvents or suspending agents so that the introduction of further substances which have chain interrupting or transfer activity is avoided in the reaction mixture.

The above described polymerization procedures can also be used for copolymerizations and mixed polymerizations with numerous co-monomers or polymerizations with exactly dosed quantities of chain transfer agents which not only regulate the molecular weight of the polymer to a certain degree of magnitude but also provide stable end groups instead of the thermally unstable hydroxy end groups on the polymer chain.

It, furthermore, is known that trioxane can be polymerized in the vapor phase when trioxane vapor and catalyst in vapor or aerosol form are simultaneously introduced into a suitable reaction vessel. In view of the relatively high boiling point of trioxane of about 114° C., this type of polymerization is rather costly and requires use of correspondingly high starting temperatures. The high heat of polymerization of trioxane, which amounts to about 13 kcal./mol, renders the control of the process using such high starting temperature very difficult as polyoxymethylene tends to decompose again at high temperatures, especially when in contact with the catalyst which is still present. It previously has not been possible to use this proces for the production of copolymers which are more advantageous than the homopolymers or for the production of polymers with stable end groups by simultaneous chain transfer reactions.

It, furthermore, is known to mix melted trioxane with free boron trifluoride or with coordination complexes of boron trifluoride in a reaction space and after partial polymerization has taken place to distribute the mixture on a moving solid surface on which the further polymerization is carried out. It is necessary to operate in a closed chamber which is maintained at a temperature near the boiling point of trioxane by passage of heated nitrogen therethrough. This causes evaporation of a part of the trioxane and of the catalyst which leads to completely uncontrollable conditions. The protective gas in addition must be very pure as the presence of moisture and oxygen are disturbing. Furthermore, access to such chambers is very difficult so that breakdowns in operation can only be corrected with great difficulty. In addition, the trioxane and catalyst which are vaporized can lead to gas phase polymerization which can cause undesired deposits.

The conditions become impossible or extremely difficult to control when copolymerization of trioxane is attempted rather than homopolymerization as the ratio of the components in the mixture constantly changes because of evaporation losses.

According to the invention it was found that a continuous bulk homopolymerization or copolymerization of lower cyclic formaldehyde polymers, especially of trioxane, in the presence of cationically active polymerization catalysts and, if desired, in the presence of a chain transfer agent and/or additions of stabilizers and/or fillers and, if desired, at elevated temperatures with exclusion of air or atmospheric oxygen and moisture can be carried out without the above-mentioned disadvantages if the liquid mixture to be polymerized is continuously introduced into a tube shaped synthetic resin structure with at least practically complete displacement of air therein and continuously passing the thus filled tube through a liquid bath maintained at the polymerization temperature or heating flue and, if desired, subsequently through a cooling bath.

The polymers obtained according to the invention can after removal from the tubes in which they were produced and after they have been pulverized by known procedures be extracted with solvents or solvent mixtures in order to remove catalyst and unconverted starting material residues. This crude polymer can then, if desired, be subjected to a known procedure for esterification or etherification of any end hydroxyl groups which may be present. It also can be stabilized against the influence of light, heat, hydrolysis, acidolysis, oxidation by the addition of known stabilizers. Valuable injection molding and/or extrusion masses can also be obtained, if necessary, by the addition of known fillers, lubricants and the like.

Similar qualities either could not be attained or only be obtained at considerable expense in the products produced by the previously employed processes. Previously in order to obtain such qualities painstaking exclusion of atmospheric moisture and other substances with chain transfer action was required. According to the invention the mixture to be polymerized is introduced into and enclosed in the synthetic resin tube, so that the access of impurities thereto is prevented. As the thickness of the mixture to be polymerized within the tubular structure can be adjusted as desired with the aid of suitable apparatus, such as by passage through suitably spaced rollers, it is possible completely to avoid the deleterious overheating of the reaction mixture and the decomposition of the polymer produced engendered thereby towards the end of the polymerization. After completion of the polymerization and after the polymer has cooled down it can be removed from the encasing tubular structure and the latter, if of suitable material, can be reused. For example, if the material of the tubular structure is thermoplastic as in the case of polyolefines, such as polyethylene and polypropylene, it is easy to produce new sheets for the production of new tubes so that practically no waste occurs.

The process according to the invention solves the difficulty in handling and transporting the mixtures to be polymerized as well as the stone hard, non-fusible products which are produced during bulk polymerization in that the mass to be polymerized is continuously provided with a surrounding casing which continuously moves along with the mass during the polymerization and such casing is continuously removed after completion of the polymerization. It is of advantage if the filled tubes are passed through the polymerization zone in as flat a form as possible. In this way the problem of the rapid removal of the heat of polymerization is solved, especially when a liquid bath is employed in such polymerization zone. This naturally is the case when one works with thicknesses of only several mm. or at most several cm. It is possible in this way to carry out the polymerization more quickly and thereby attain higher velocities for the continuously moving material so as to increase the economy of the process.

As the process according to the invention is carried out in a practically closed vessel, no disturbing foreign substances can react with the reaction mixture. The greatest advantage, however, resides in the fact that no evaporation losses whatsoever can occur. The composition of the mixture to be polymerized always remains constant whether it is a mixture of pure trioxane with a catalyst or whether further components, such as, comonomers or chain transfer agents, are also present. In addition, a more free selection of comonomers and catalysts are provided as their possibly greater fluidity or volatility as compared to trioxane plays no role as the polymerization is carried out in a closed vessel.

The process according to the invention therefore renders it possible to combine the advantages of bulk polymerization in a closed vessel with the advantages of the other polymerization methods without being subjected to the disadvantages of such previously known processes.

The lower cyclic polymers of formaldehyde and especially trioxane can be used as the materials to be polymerized. Also, mixtures of, for example, trioxane with other cationically polymerizable monomers, such as, epoxides and other oxacyclic ring systems or substances with ethylenic or acetylenic multiple bonds, as has already been indicated, can be polymerized according to the invention with special advantage. Examples of such mixtures, for instance, are: trioxane and dioxolane, trioxane and epichlorohydrin, trioxane and styrene, trioxane and acrylonitrile and similar mixtures.

In addition, exactly dosed quantities of chain transfer agents can be included in the mixtures to be polymerized in order that a certain range of molecular weights is obtained during the polymerization and/or in order to form stable end groups by the chain transfer reaction. Aliphatic or araliphatic esters, ethers or acetals are suited for this purpose.

It is self-understood that polymeric chain transfer agents, such as polymeric ethers, esters and acetals, can also be added to the mixture to be polymerized whereby, depending upon the structure of the added polymer, graft copolymers or linear copolymers can be obtained. The polymeric chain transfer agent can also itself already be a copolymer, such as, for example, of methyl methacrylate and styrene. Polymeric chain transfer agents with a degree of polymerization of at least 10 are advantageous.

Expediently, a homogeneous liquid mixture of the participants in the reaction is used as the starting material which is only prepared just before it is introduced into the tubular casing in which the polymerization is carried out. The period the finished mixture remains in the mixing vessel employed must be regulated by appropriate supply of the individual components and withdrawal of the finished homogeneous mixture so that the mixture is still a thin liquid when it is introduced into the tubular casing.

In some embodiments of the process according to the invention, it is advisable first to produce a prepolymer or partial polymer (low molecular weight polymer) from only a relatively small quantity of the monomer and/or comonomer and the total quantity of catalyst and then mix such prepolymer with the remainder of the monomer and/or copolymer. This procedure facilitates the homogeneous mixture of all reaction participants and substantially reduces the time required for the mixing.

According to an especially simple variation of the process, the catalyst is not first mixed with the mixture to be polymerized but rather applied in the form of a solution or paste on the inner surfaces of the tubular casing so that the inner surfaces of the casing are to a certain extent impregnated with the finely divided catalyst. The catalyst application can, for example, be by spraying or spreading. In order to achieve a uniform distribution of the catalyst in the mixture to be polymerized, it is expedient to pass the tubular casing directly after it has been filled with the mixture to be polymerized through a series of opposed rollers to effect intensive kneading of the contents of such casing.

The known cationic catalysts, such as, Lewis-acids, acid hydrogen acids with complex anions, oxonium salts, salts or organic derivatives of perhalic acids, free halogens and the like, can be employed as catalysts in the process according to the invention. Initiators which only develop their full activity at somewhat raised temperatures, such as, complex compounds of boron trifluoride, oxonium fluoborates, diazonium fluoborates, salts of perchloric acid and the like, are especially suited for the purposes of the invention.

If formation of cross-linked products is desired, it is also possible to use substances with more than one polymerizable group as comonomers.

In carrying out the process according to the invention the homogeneous mixture to be polymerized is continuously supplied to the tubular casing in such quantities that the air in such casing is at least practically completely displaced. Such displacement can be assisted with the aid of a protective gas, such as nitrogen. The filled casing is then passed through a polymerization zone, preferably a liquid bath maintained at the desired polymerization temperature. Instead of a liquid bath, a heating flue, preferably operated with a protective gas, such as nitrogen, can also be used in the polymerization zone. The mixture polymerizes within the casing during its passage through the heated polymerization zone. After its passage through the polymerization zone, the whole structure can be cooled down in a water bath and subsequently the casing is cut open and the polymer removed and pulverized.

In order to remove the unreacted monomer or monomers and catalysts residues the polymer can be extracted with a suitable solvent or solvent mixture. It is expedient to add a small quantity of basic substances to the extraction agent to neutralize the catalyst residues. The unconverted monomer or monomers can be recovered in a known manner.

Polyethylene or polypropylene are preferably employed as the material for the tubular casing used according to the invention. However, other synthetic resins which are stable and inert under the conditions of the process can also be used.

The tubular structure for the casing can, for example, be produced by extrusion using an annular nozzle which is also provided with a central opening for the introduction of the material to be polymerized. However, an inert gas instead of air is required for blowing the tube. This method of tube formation, however, is not the most economical as the blowing of the tube is rather slow in comparison to the polymerization speeds attainable. It has proved more satisfactory to form the tubular structure by welding together the edges of one or two preformed weldable synthetic resin strips and shortly after formation of the tubular structure introducing the material to be polymerized, for example, through a tube extending into the interior thereof. Instead of using the welding technique, the tubular structure can also be formed from a strip or several strips by closure with the aid of clamps, sewing, or an adhesive or an adhesive strip.

According to a further modification, a preformed tubular casing can be employed which is slit open on one side to permit continuous introduction of the material to be polymerized and after such introduction reclosed, for example, by welding. When the preformed tubular casing was rolled up, as usually would be the case, substantially all of the air would have been displaced therefrom so that the use of a protective gas during introduction of the material to be polymerized is unnecessary and other measures for displacing the air are not required.

The following examples will serve to illustrate the process according to the invention. The proportions given in such examples are by weight unless otherwise specified.

*Example 1*

90 parts of trioxane were intensively mixed with 0.005 part boron trifluoride diethyl etherate (dissolved in nitromethane) at 75° C. for 30 seconds. The mixture was then poured into a polyethylene tube having a wall thickness of about 0.1 mm. so as to displace any air contained therein. The thus filled tube was flattened out in order that the thickness of the cross-section was about 5 mm. and then passed through a water bath maintained at 80° C. for 7 minutes. Thereafter it was cooled down in a cold water bath and the tube cut open and the resulting polymer removed and pulverized. After washing with water to which a small quantity of ammonia had been added and drying, the polymer possessed an inherent viscosity of 1.3 (measured in dimethyl formamide at 130° C.).

*Example 2*

The interior surfaces of a polyethylene tube with a wall thickness of 0.1 mm. were sprayed with a 5% solution of boron trifluoride diethyl etherate. Then 90 parts of melted trioxane were poured into such tube so as to displace any air contained therein and the filled tube then kneaded intensively and then flattened out to a thickness of 4-5 mm. The flattened tube was then maintained at a temperature of about 80° C. with the aid of warm air. After cooling and processing as in Example 1, a polymer of an inherent viscosity of 1.65 was obtained in a 78% yield.

*Example 3*

90 parts of trioxane and 3 parts of 2-vinyl-1,3-dioxacycloheptene-(5) were mixed at 75° C. for 1 minute with 0.01 part of boron trifluoride diethyl etherate. The mixture was introduced into a polyethylene tube with a wall thickness of 0.2 mm. as in the other examples and after such tube was flattened out to a thickness of 5 mm. it was passed for 10 minutes through a water bath maintained at 80° C. The processing was as in Example 1. The inherent viscosity of the resulting copolymer was 0.6 and upon heating such copolymer to 220° C. under nitrogen it lost 17% of its weight during the first hour whereas during the next three hours' heating only 1% per hour was lost.

*Example 4*

90 parts of trioxane and 0.8 part of formaldehyde diethyl acetal were intensively mixed at 75° C. for 15 seconds with 0.01 part of boron trifluoride diethyl etherate. The mixture was poured into a polyethylene tube having a wall thickness of 0.05 mm. and the filled tube flattened to a thickness of about 5 mm. The flattened filled tube was then maintained at 80° C. for 3 minutes with the aid of warm air and then cooled in a cold water bath. Upon processing of the polymer as in Example 1, it was obtained in an 80% yield and for the greater part consisted of polyoxymethylene diethyl ether in view of the chain transfer which had been effected. It only lost 20% of its weight upon heating at 220° C. under nitrogen for 4 hours, the remainder was thermally stable. The inherent viscosity of the polymer was 0.5.

*Example 5*

90 parts of trioxane and 2 parts of dioxolane were intensively mixed at 75° C. for 25 seconds with 0.01 part of boron trfluoride diethyl etherate. The mixture was introduced into a polyethylene tube as in the preceding examples and polymerized at 80° C. for 1.5 minutes and then processed as in the preceding examples. An 82% yield of a copolymer with an inherent viscosity of 1.4 was obtained. Said copolymer upon heating to 220° C. under nitrogen lost 11% of its weight and upon heating 3 further hours only a further 1.8%. The polymer can be molded into plates at 200° C. under a pressure of 200 kp./cm.$^2$. Such plates had a bending strength of 1.160 kp./cm.$^2$ and a notched bar impact resistance of 10 cm. kp./cm.$^2$ (according to DIN).

*Example 6*

90 parts of trioxane, 4 parts of 4-methyl-1,3-dioxane and 0.4 part of formaldehyde diethyl acetal were mixed with 0.01 part of boron trifluoride diethyl etherate at 75° C. for 1 minute. The mixture was introduced into a polyethylene tube as in the preceding examples and polymerized at 80° C. for 4 minutes and then processed as in the preceding examples. A copolymer with an inherent viscosity of 1.55 which lost 19% of its weight during 4 hours' heating at 220° C. under nitrogen was obtained. Pressure molded plates of this copolymer had a bending strength of 1.120 kp./cm.$^2$ and a notched bar impact resistance of 7 cm. kp./cm.$^2$.

*Example 7*

90 parts of trioxane, 2 parts of a finished polycarbonate and 2 parts of 1,3-dioxolane were intensively mixed with 0.01 part of boron trifluoride diethyl etherate for 55 seconds at 75° C. The mixture was introduced into a polyethylene tube and the filled tube flattened to a thickness of about 5 mm. The mixture in the flattened tube was then polymerized for 2.5 minutes at 80° C. The resulting copolymer after processing as in the preceding examples was obtained in a 76% yield and had an inherent viscosity of 0.95. Upon heating at 220° C. under nitrogen such copolymer lost 11% of its weight during the first hour and only a scan 2% during each of the 3 following hours.

*Example 8*

3 parts of 1,3-dioxacycloheptane and 0.01 part of boron trifluoride diethyl etherate were intimately mixed and allowed to stand at room temperature to form a prepolymer of the consistence of a colorless viscous oil. Such oil was then mixed with 90 parts of melted trioxane at 75° C. The resulting mixture was then introduced into a polyethylene tube as in the preceding examples and polymerized at 80° C. for 2.5 minutes and then processed as in the preceding examples. The resulting copolymer which was obtained in a yield of 74% had an inherent viscosity of 0.8 and was 86% stable upon heating at 220° C. under nitrogen.

We claim:

1. In a method for the continuous bulk polymerization of a polymerizable mass comprising a lower cyclic formaldehyde in contact with an effective amount of a polymerization catalyst while excluding atmospheric oxygen and moisture, the steps of continuously introducing the polymerizable mass into a moving tube shaped synthetic resin structure while at least practically completely displacing all air in such tube thereby encasing the polymerizable mass in said moving tube shaped structure continuously passing the thus encased polymerizable mass along with the encasing tube shaped structure through a polymerization zone maintained at a temperature required for polymerization of the polymerizable mass until the polymerization has been effected and subsequently removing the encasing tube shaped structure from the polymer produced.

2. The method of claim 1 in which said lower cyclic formaldehyde polymer is trioxane.

3. The method of claim 2 in which said synthetic resin is polyethylene.

4. The method of claim 2 in which said polymerization zone is in the form of a liquid bath maintained at the polymerization temperature required for the polymerizable mass.

5. The method of claim 2 in which the filled tube is flattened out substantially during its passage through the polymerization zone.

6. The method of claim 2 in which the catalyst is applied to the inner surface of the tube shaped synthetic resin structure before the polymerizable mass is introduced therein and the filled tube is kneaded to effect mixture of the catalyst with the polymerizable mass before the filled tube is passed through the polymerization zone.

References Cited by the Examiner
UNITED STATES PATENTS

| | | | |
|---|---|---|---|
| 2,403,476 | 7/1946 | Berry et al. | 23—252 XR |
| 2,795,571 | 6/1957 | Schneider | 260—67 |
| 2,982,758 | 5/1961 | Michaud | 260—67 |
| 3,027,352 | 3/1962 | Walling et al. | 260—67 |
| 3,115,480 | 12/1963 | Steadman et al. | 260—67 |

SAMUEL H. BELCH, *Primary Examiner.*

WILLIAM H. SHORT, *Examiner.*

L. M. MILLER, *Assistant Examiner.*